US012094283B2

(12) United States Patent
Harai et al.

(10) Patent No.: US 12,094,283 B2
(45) Date of Patent: Sep. 17, 2024

(54) PAPER SHEET TRANSPORTATION APPARATUS

(71) Applicant: FUJITSU FRONTECH LIMITED, Tokyo (JP)

(72) Inventors: Daiki Harai, Inagi (JP); Koichi Hosoyama, Inagi (JP); Tomoyuki Tamahashi, Inagi (JP); Hiroshi Yanagida, Inagi (JP); Isamu Esaki, Inagi (JP); Kazuhiro Kagoshima, Inagi (JP)

(73) Assignee: FUJITSU FRONTECH LIMITED, Tokyo (JP)

( * ) Notice: Subject to any disclaimer, the term of this patent is extended or adjusted under 35 U.S.C. 154(b) by 349 days.

(21) Appl. No.: 17/360,523

(22) Filed: Jun. 28, 2021

(65) Prior Publication Data

US 2021/0327195 A1 Oct. 21, 2021

Related U.S. Application Data

(63) Continuation of application No. PCT/JP2019/001307, filed on Jan. 17, 2019.

(51) Int. Cl.
*B65H 1/10* (2006.01)
*G07D 11/13* (2019.01)

(52) U.S. Cl.
CPC ............... *G07D 11/13* (2019.01); *B65H 1/10* (2013.01); *B65H 2301/4212* (2013.01)

(58) Field of Classification Search
CPC . B65H 1/10; B65H 1/12; B65H 31/10; B65H 2301/4212; B65H 2405/1114; B65H 2405/1119; B65H 2405/11152; B65H 2405/211; B65G 2301/5133
USPC ........................................................ 271/208
See application file for complete search history.

(56) References Cited

U.S. PATENT DOCUMENTS

| | | | | |
|---|---|---|---|---|
| 6,145,649 A * | 11/2000 | Belanger | B65H 29/68 | 198/493 |
| 6,167,232 A * | 12/2000 | Jimenez | H04N 1/00588 | 399/367 |
| 6,540,090 B1 | 4/2003 | Sakai et al. | | |
| 6,623,003 B1 * | 9/2003 | Koizumi | B65H 29/12 | 347/264 |

(Continued)

FOREIGN PATENT DOCUMENTS

| | | |
|---|---|---|
| JP | 61145758 A | 9/1986 |
| JP | 09058915 A | 3/1997 |

(Continued)

OTHER PUBLICATIONS

Written opinion of the ISR issued in PCT/JP2019/001307, dated Apr. 9, 2019 (partial translation).
Office action issued in corresponding Japanese patent application No. 2020-566056, dated Nov. 16, 2021.
Office action issued in corresponding Chinese patent application No. 201980088630.X, dated Jul. 29, 2022.

(Continued)

*Primary Examiner* — Joseph C Rodriguez
(74) *Attorney, Agent, or Firm* — Greer Burns & Crain Ltd.

(57) ABSTRACT

A paper sheet handling apparatus includes: an accumulation part in which paper sheets are accumulated; and a guide part on which at least leading-edge sides of the paper sheets within the accumulation part in an entering direction of the paper sheets entering the accumulation part are placed, wherein the guide part extends in the entering direction obliquely upward and is lowered under a weight of the paper sheets.

5 Claims, 10 Drawing Sheets

(56) References Cited

U.S. PATENT DOCUMENTS

| | | | | |
|---|---|---|---|---|
| 7,708,271 | B2 * | 5/2010 | Major, Jr. | B65H 31/00 271/208 |
| 10,233,046 | B2 * | 3/2019 | Maeda | G03G 15/36 |
| 2002/0074713 | A1 * | 6/2002 | Bakodledis | B65H 5/06 271/145 |
| 2003/0202830 | A1 * | 10/2003 | Oh | B65H 37/00 399/390 |
| 2005/0201794 | A1 | 9/2005 | Suzuki | |
| 2010/0166474 | A1 | 7/2010 | Suzuki | |
| 2013/0063856 | A1 * | 3/2013 | Koo | B65H 5/062 361/212 |
| 2017/0102660 | A1 * | 4/2017 | Maruta | G03G 15/6552 |
| 2017/0107072 | A1 * | 4/2017 | Nakamura | B65H 31/02 |
| 2017/0255156 | A1 * | 9/2017 | Tokuma | G03G 15/6552 |
| 2018/0024490 | A1 | 1/2018 | Takeuchi et al. | |

FOREIGN PATENT DOCUMENTS

| | | | |
|---|---|---|---|
| JP | 2000327204 | A | 11/2000 |
| JP | 2005298213 | A | 10/2005 |
| JP | 2006001660 | A | 1/2006 |
| JP | 3741893 | B2 | 2/2006 |
| JP | 2017154848 | A | 9/2017 |
| JP | 2018012598 | A | 1/2018 |

OTHER PUBLICATIONS

ISR issued in PCT/JP2019/001307, dated Apr. 9, 2019.

Written opinion of the ISR issued in PCT/JP2019/001307, dated Apr. 19, 2018 (partial translation).

Office action issued in corresponding Japanese patent application No. 2020-566056, dated Mar. 1, 2022.

* cited by examiner

PAPER SHEET TRANSPORTATION APPARATUS

CROSS-REFERENCE TO RELATED APPLICATION

This application is continuation application of International Application PCT/JP2019/001307 filed on Jan. 17, 2019 and designated the U.S., the entire contents of which are incorporated herein by reference.

FIELD OF THE INVENTION

The present invention relates to a paper sheet transportation apparatus.

BACKGROUND OF THE INVENTION

A conventionally proposed bill organizing machine is one wherein an accumulation part in which bills are accumulated is provided with a guide mechanism part that moves under the weight of a bill drawn out of a transportation unit (see, for example, Japanese Patent No. 3741893).

In the bill organizing machine, initial bills to be drawn out to the accumulation part are drawn out of the transportation unit toward a narrow space. As more bills are layered within the accumulation part, the space within the accumulation part gradually increases in accordance with the guide mechanism part being lowered.

BRIEF SUMMARY OF THE INVENTION

In one aspect, a paper sheet handling apparatus includes: an accumulation part in which paper sheets are accumulated; and a guide part on which at least leading-edge sides of the paper sheets within the accumulation part in an entering direction of the paper sheets entering the accumulation part are placed, wherein the guide part extends in the entering direction obliquely upward and is lowered under a weight of the paper sheets.

The object and advantages of the present invention will be realized by the elements set forth in the claims or combinations thereof.

DETAILED DESCRIPTION OF THE INVENTION

Figure 1:
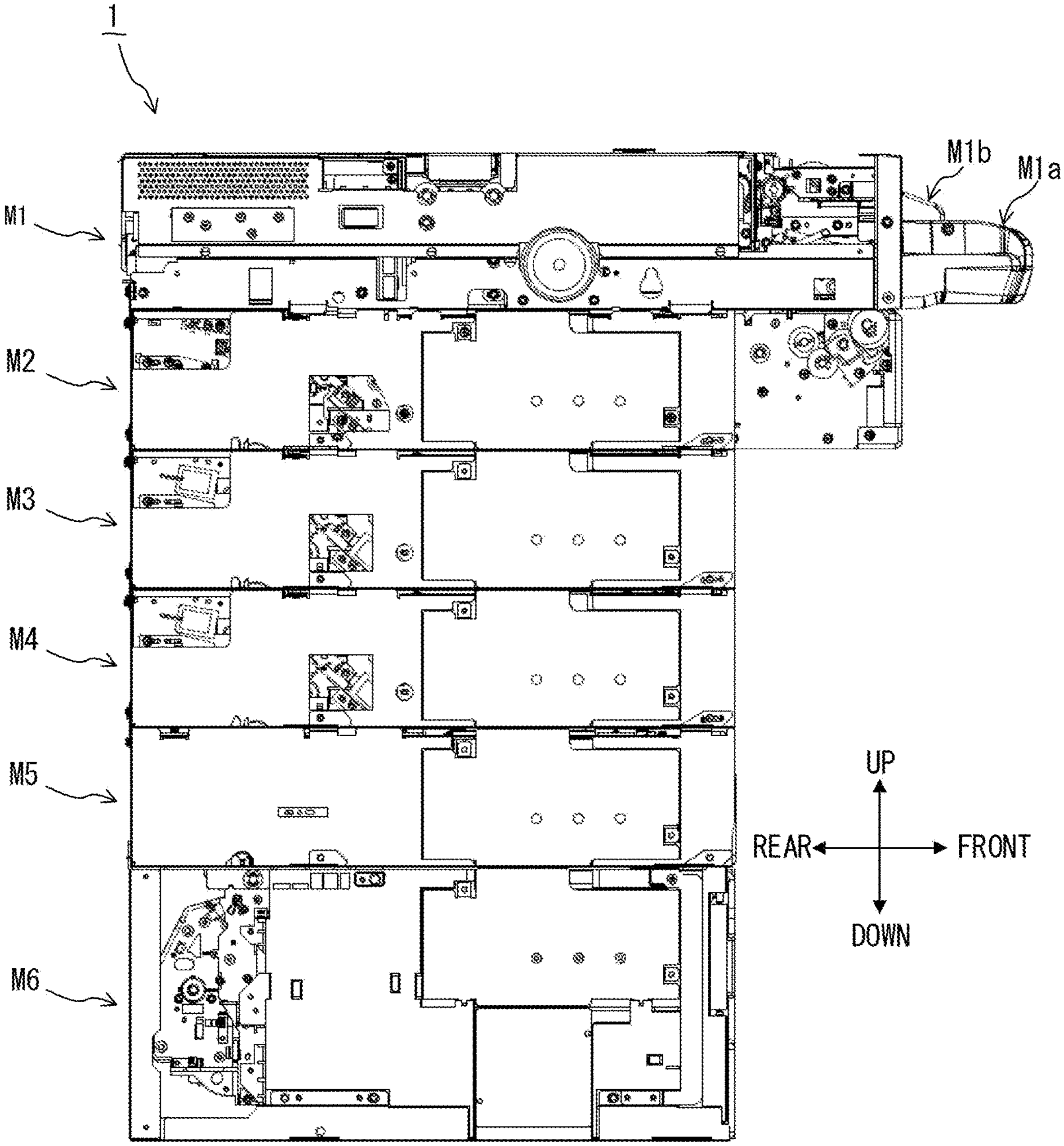
FIG. 1 is a left side view illustrating a paper sheet handling apparatus in accordance with a first embodiment.

In the meantime, paper sheets such as bills could be curved, e.g., curled, and if such paper sheets are randomly accumulated within an accumulation part without being organized, the paper sheets could be accumulated in a curled manner such that the rear edge portion of a paper sheet in the entering direction of the paper sheets entering the accumulation part is folded upward.

Accordingly, the following paper sheet could collide with the already accumulated paper sheet when entering the accumulation part. Hence, the paper sheet could be incapable of being accumulated, or could be stuck and incapable of being taken out.

In this regard, bills could be accumulated on the guide mechanism part of the above-described paper organizing machine, with the rear-edge side of a bill in the entering direction of the bills entering the accumulation part folded upward, so if bills are accumulated in a curled manner such that the rear edge portion of a bill folded upward, this will lead to collision with the following bill.

By referring to the drawings, the following describes a paper sheet handling apparatus in accordance with first to third embodiments of the present invention.

First Embodiment

FIG. 1 is a left side view illustrating a paper sheet handling apparatus 1.

FIG. 1 and FIGS. 2-5 (described hereinafter) indicate a front-rear direction, a left-right direction, and an up-down direction for descriptive purposes. As an example, the front-rear and left-right directions may be horizontal directions, and the up-down direction may be a vertical direction.

As depicted in FIG. 1, the paper sheet handling apparatus 1 includes, in the following order from the upper side, a top module M1, a drawing-in and recycling module M2, recycling modules M3 and M4, a replenishment module M5, and a collection module M6.

The top module M1 is provided with a forwardly protruding money ejection unit M1*a* for ejecting a bill B and a forwardly protruding money insertion unit M1*b* for inserting a bill B. Note that the bills B are examples of paper sheets. The paper sheets are not limited to bills B but may be continuous forms, expense sheets, or flat paper. In such a case, the money ejection unit M1*b* will function as an ejector, and the money insertion unit M1*a* will function as an inserter.

Figure 2:
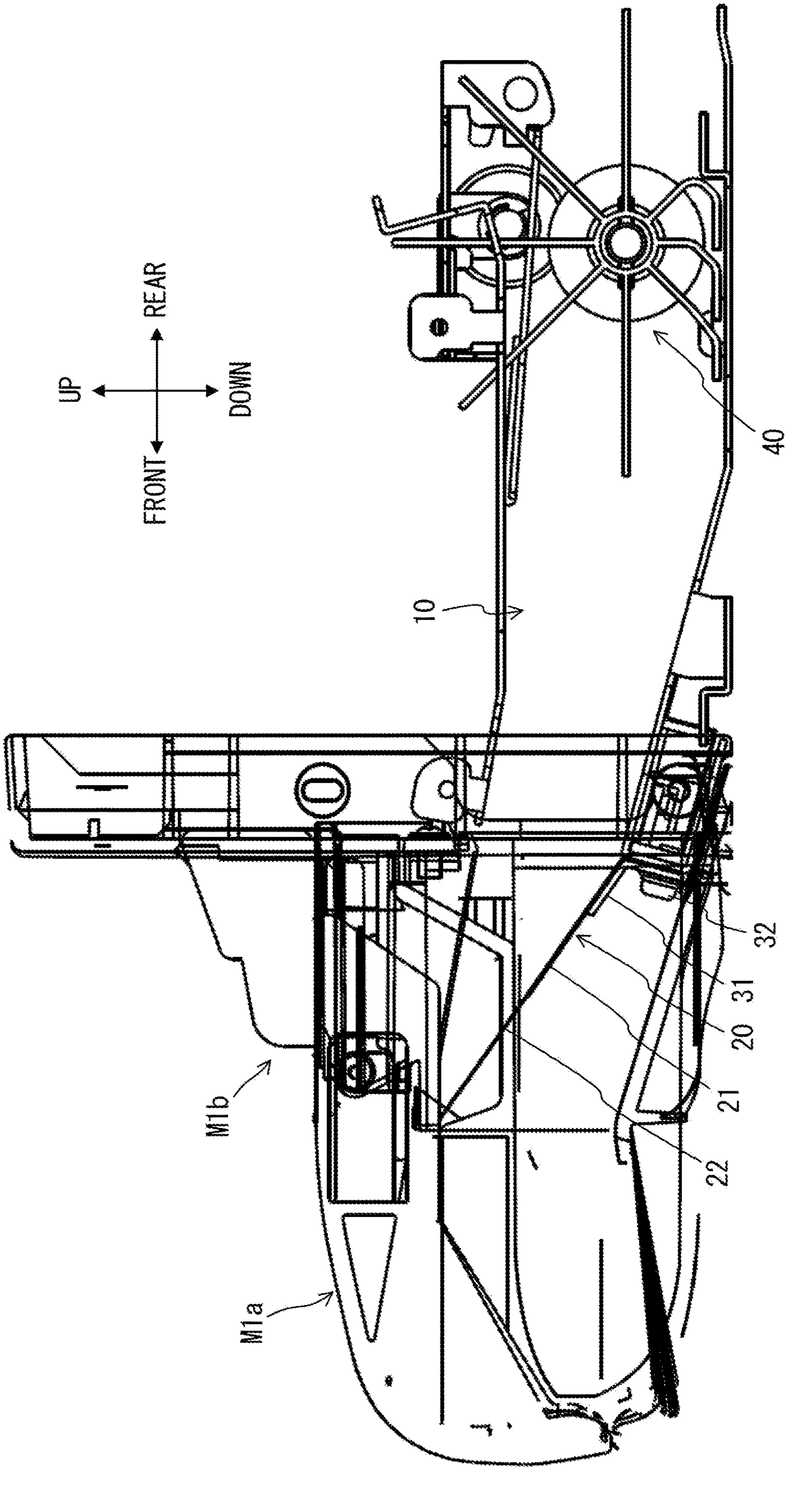
FIG. 2 is a right side view illustrating the internal structures of an accumulation part and other components of a paper sheet handling apparatus in accordance with a first embodiment.

The top module M1 has disposed therewithin an accumulation part 10, a guide part 20, and an impeller 40 depicted in FIG. 2, as well as a transportation unit for transporting a bill B, and a validation unit for performing validation of the bill B.

When a customer has forgotten to take a bill B ejected on the money ejection unit M1*a* and the remaining of the bill B is sensed, the drawing-in and recycling module M2 transports and draws the remaining bill B into a front portion.

For example, a rear portion of the drawing-in and recycling module M2 and front portions and rear portions of the recycling modules M3 and M4 may each have disposed therein a recycle bill accommodation unit (not illustrated) for accommodating bills B sandwiched between films in a winding manner.

The replenishment module M5 accommodate bills B to be ejected.

The collection module M6 accommodates bills B not to be recycled, among inserted bills B.

The above configuration of the paper sheet handling apparatus 1 is nothing but an example, and any configuration can be used as long as the paper sheet handling apparatus 1 includes a transportation unit for transporting bills B or a processing unit for performing some sort of processing on bills B, such as validation or examination.

FIG. 2 is a right side view illustrating the internal structures of the accumulation part 10 and other components of the paper sheet handling apparatus 1.

Figure 3A:
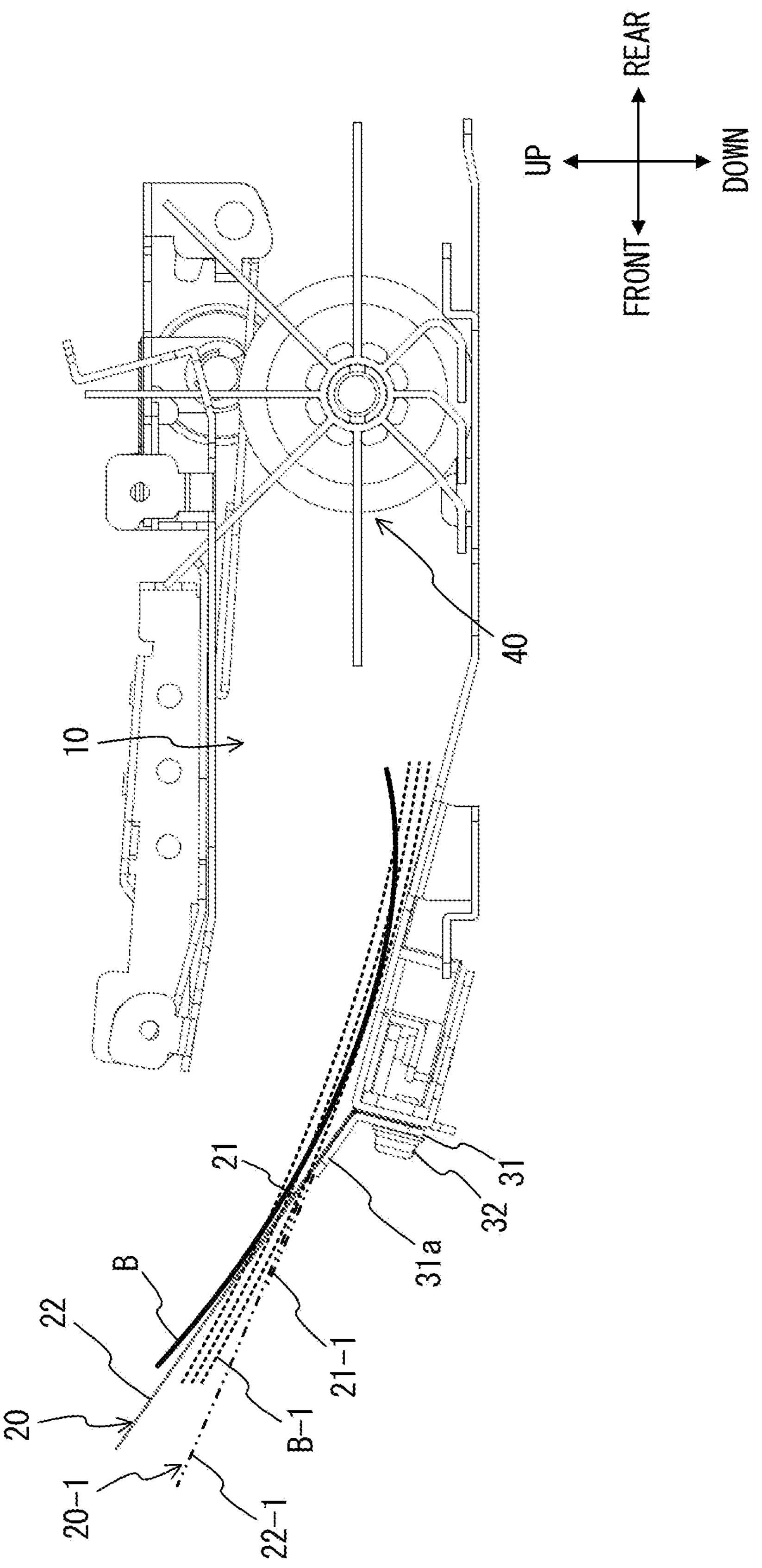
FIG. 3A is a right side view illustrating an accumulation part and a guide part in a first embodiment.
Figure 3B:
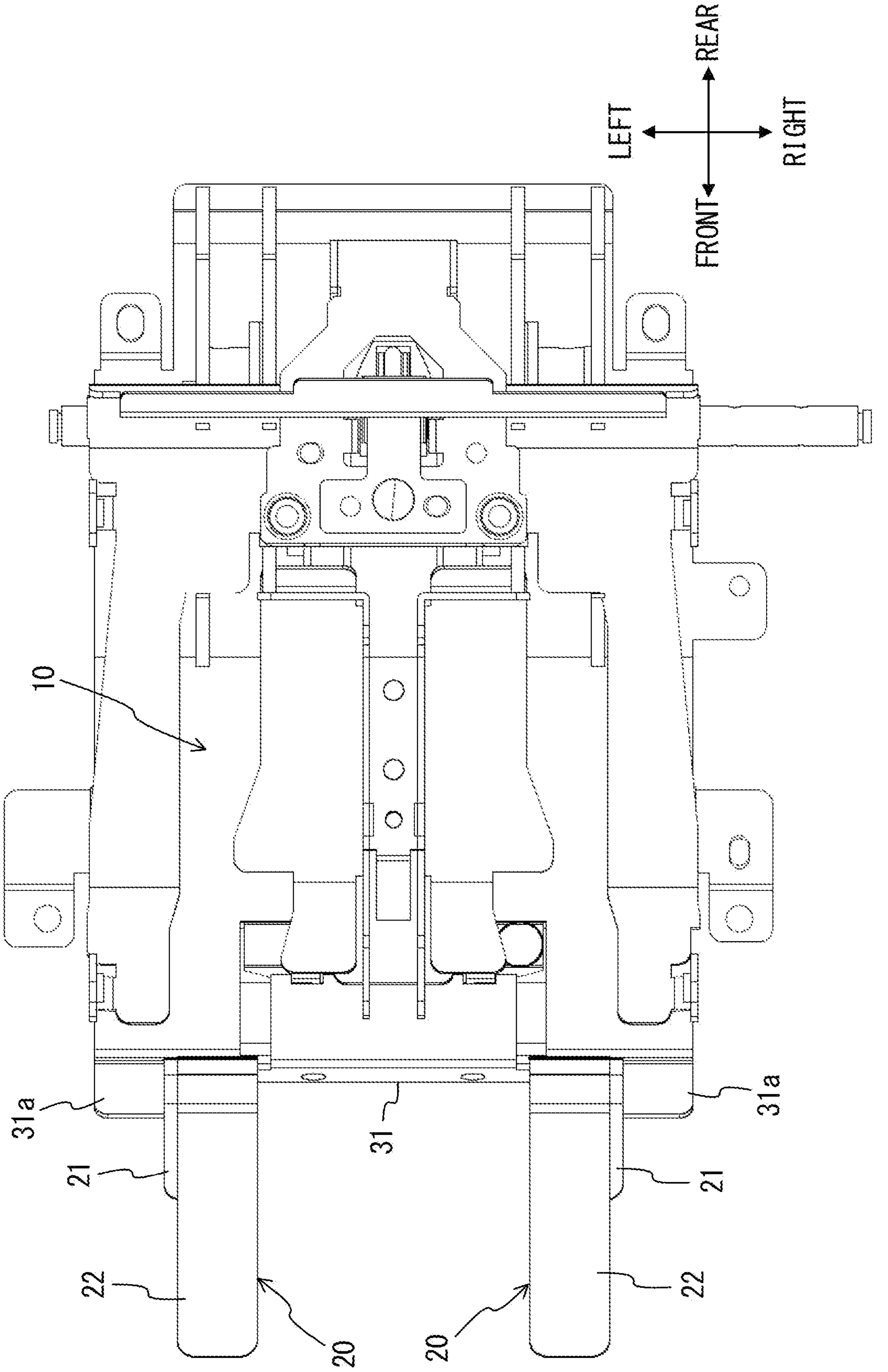
FIG. 3B is a plan view illustrating an accumulation part and guide parts in a first embodiment.
Figure 3C:
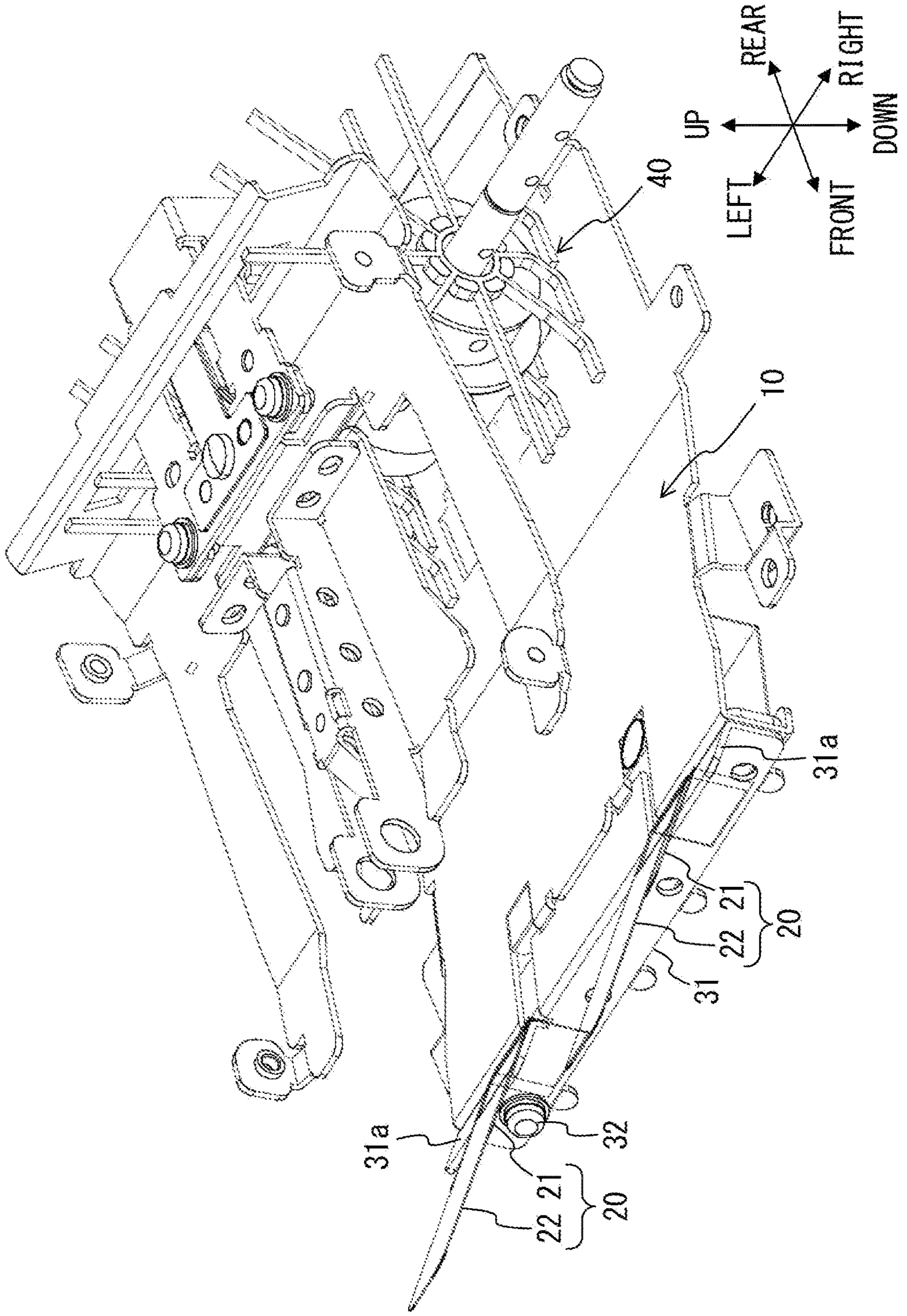
FIG. 3C is a front perspective view illustrating an accumulation part and guide parts in a first embodiment.

FIGS. 3A-3C are a right side view, a plan view, and a front perspective view illustrating the accumulation part 10 and the guide part 20.

Bills B (see FIG. 3A) to be taken out by, for example, a user inserting fingers through the money ejection unit M1*a*, i.e., bills B to be ejected, are accumulated within the accumulation part 10 depicted in FIG. 2.

As depicted in FIGS. 3B and 3C, for example, two guide parts 20 may be disposed to be spaced apart from each other in the left-right direction (the width direction of a bill B). Alternatively, one guide part 20 or three or more guide parts 20 may be provided.

As illustrated in FIG. 3A, the leading edge side of a bill B within the accumulation part 10 in the entering direction of the bill B entering the accumulation part 10 (front direction) is placed on the guide part 20. The guide part 20 extends in the entering direction obliquely upward. As the number of bills B accumulated within the accumulation part 10 increases (see bills B-1 indicated by dashed lines), the guide part 20 is elastically deformed under the weight of the bills B such that the leading edge portion thereof is lowered (see the guide part 20-1 indicated by a two-dot dash line).

Alternatively, the guide part 20 may not be elastically deformed. For example, the guide part 20 may be rotatably supported by a rotation shaft and biased to rotate upward by a biasing mechanism such as a torsional spring provided on the rotation shaft. In this case, the biasing mechanism biases and thus rotates the guide part 20 upward with such a biasing force that the leading edge portion of the guide part 20 is lowered under the weight of a certain number of bills B.

Alternatively, at least a portion of the guide part 20 may be lowered under the weight of bills B, and the portion to be lowered is not limited to the leading edge portion of the guide part 20.

As depicted in FIGS. 3B and 3C, the two guide parts 20 each include a first elastic plate 21 shaped like a plate and a second elastic plate 22 shaped like a plate. The first elastic plate 21 and the second elastic plate 22 are examples of the first and second guide sections.

The second elastic plate 22 is disposed over the first elastic plate 21 in an overlapping manner and extends obliquely upward by a longer distance than the first elastic plate 21.

For example, the first elastic plate 21 and the second elastic plate 22 may be plastic films such as polyimide films or mylar (polyester) films. The first elastic plate 21 and the second elastic plate 22 may be formed from the same material or different materials.

A fixation member 31 for fixing, as depicted in FIGS. 3A-3C, the first elastic plate 21 and the second elastic plate 22 is fixed inside the paper sheet handling apparatus 1 by a fixation screw 32. Thus, the fixation member 31 can be attached/detached together with the first elastic plate 21 and the second elastic plate 22 by screwing/unscrewing the fixation screw 32. Accordingly, since the first elastic plate 21 and the second elastic plate 22 can be attached and detached, the guide part 20 can be replaced, as appropriate, with any guide part 20 having a desired size or a desired inclination angle in accordance with the size (type) or the like of bills B. Although FIG. 3C depicts only the fixation screw 32 located in the vicinity of the guide part 20 on the left side, a fixation screw 32 will actually be also disposed in the vicinity of the guide part 20 on the right side.

The fixation member 31 includes two supporting sections 31*a* each supporting each of the guide parts 20 (the first elastic plates 21 and the second elastic plates 22). The supporting section 31*a* extends, together with the guide part 20, in the entering direction (front direction) obliquely upward and supports the base side of the guide part 20. The base portion of the guide part 20 may be fixed inside the paper sheet handling apparatus 1 together with the fixation member 31 by the fixation screw 32.

The impeller 40 depicted in FIGS. 3A and 3C is an example of a transportation unit that causes a bill B to enter the accumulation part 10 by transporting the same.

In the first embodiment, the paper sheet handling apparatus 1 includes: the accumulation part 10 in which bills B, i.e., examples of paper sheets, are accumulated; and the guide part 20 on which leading-edge sides (at least leading-edge sides) of the bills B within the accumulation part 10 in an entering direction of the bills B entering the accumulation part 10 (front direction) are placed. The guide part 20 extends in the direction of entering the accumulation part 10 obliquely upward and is lowered under the weight of the bills B.

Accordingly, even if a curved bill B, e.g., a curled bill B, is placed in the accumulation part 10, the rear edge portion of the bill B can be suppressed from being warped upward since the guide part 20 extends in the entering direction obliquely upward. Thus, the following bill B entering the accumulation part 10 can be suppressed from colliding with the preceding bill B. Meanwhile, as the number of bills B accumulated within the accumulation part 10 increases (see the bills B-1 indicated by dashed lines in FIG. 3A), the guide part 20 is lowered under the weight of the bills B (see the guide part 20-1 indicated by a two-dot dash line), so that the bills B can be accumulated with a desired inclination. Accordingly, the first embodiment allows the accumulation of bills B to be stabilized.

In the first embodiment, the guide part 20 includes: the first elastic plate 21, i.e., an example of the first guide section; and the second elastic plate 20, i.e., an example of the second guide section, which is disposed over the first elastic plate 21 in an overlapping manner and extends by a longer distance than the first elastic plate 21. Thus, the amount of deformation of the guide part 20 can be limited within a desired range by the first elastic plate 21 supporting the second elastic plate 22 while the second elastic plate 22 is ensuring an amount of lowering of the leading edge side of the guide part 20.

In the first embodiment, the guide part 20 includes the first elastic plate 21 and the second elastic plate 22, i.e., examples of the elastic plate shaped like a plate, and is lowered in accordance with the first elastic plate 21 and the second elastic plate 22 being elastically deformed under the weight of bills B. Thus, the simple configuration allows the guide part 20 to be lowered under the weight of bills B.

In the first embodiment, the paper sheet handling apparatus 1 further includes the fixation member 31 for fixing the guide part 20, and the fixation member 31 can be attached/detached together with the guide part 20 and includes the supporting section 31*a* for supporting the base side of the guide part 20. Thus, the amount of deformation of the guide part 20 can be limited more easily within a desired range.

Second Embodiment

FIGS. 4A-4D are a right side view, a plan view, a front perspective view, and a back perspective view illustrating the accumulation part 10 and guide parts 50.

The second embodiment is different from the first embodiment in that guide parts 50 including elastic plates 51 and antistatic brushes 52 are provided in place of the guide parts 20 including the first elastic plates 21 and the second elastic plates 22 in the first embodiment and that an antistatic brush 61, i.e., an example of an abutment member, is provided. Regarding the other matters, the second embodiment may be the same as the first embodiment, and detailed descriptions of such matters in the second embodiment are omitted herein.

Figure 4A:
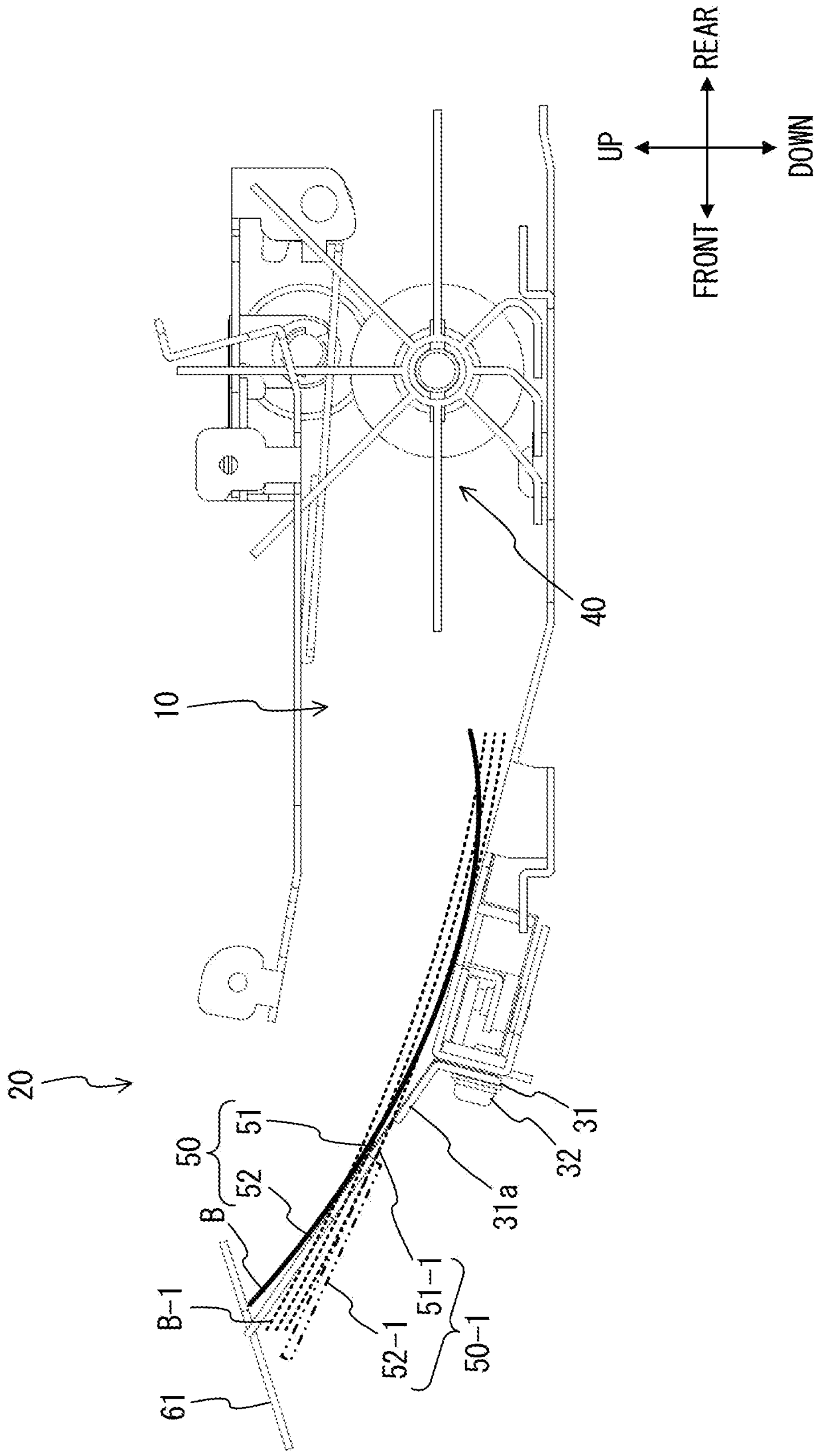
FIG. 4A is a right side view illustrating an accumulation part and a guide part in a second embodiment.
Figure 4B:
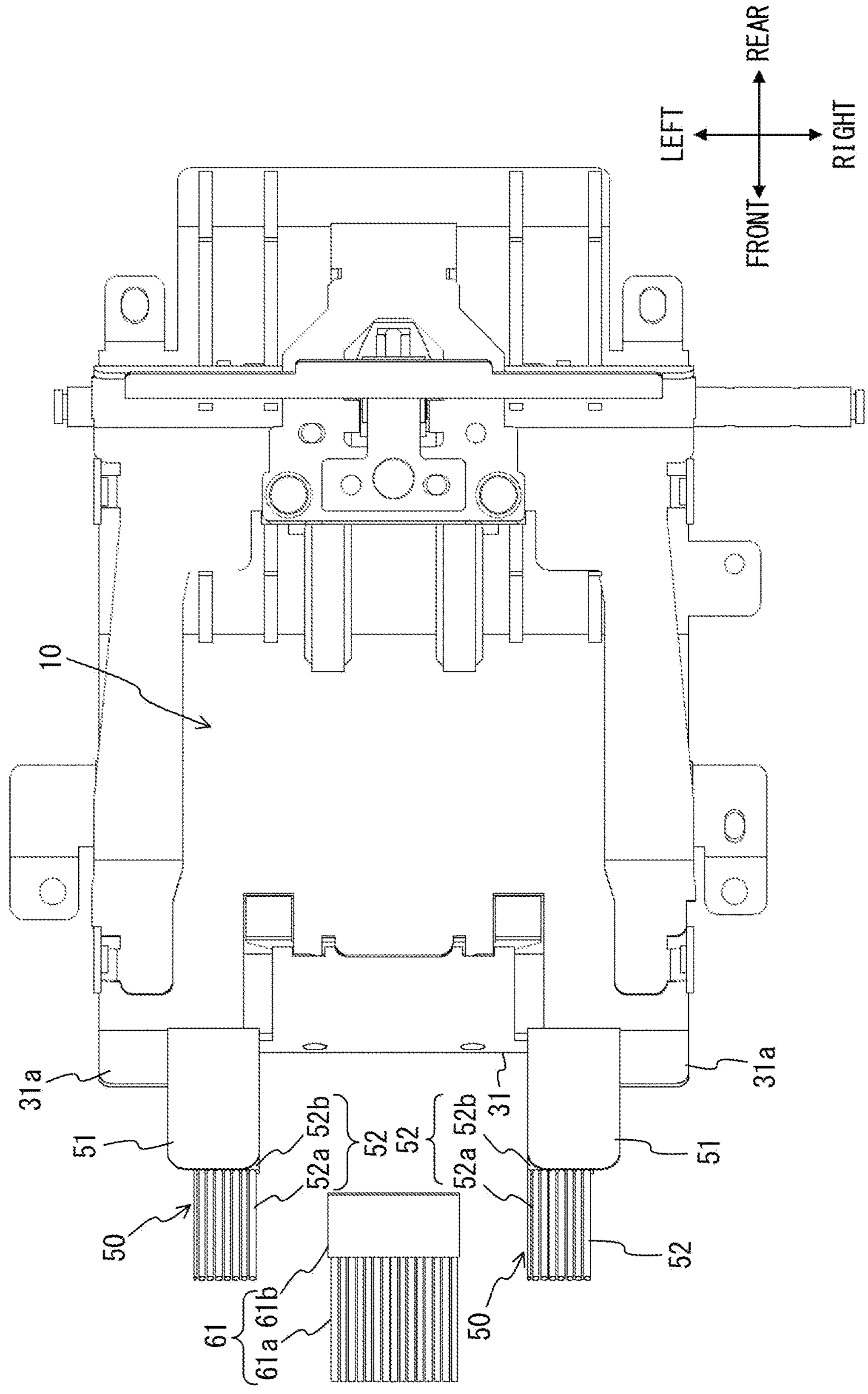
FIG. 4B is a plan view illustrating an accumulation part and guide parts in a second embodiment.
Figure 4C:
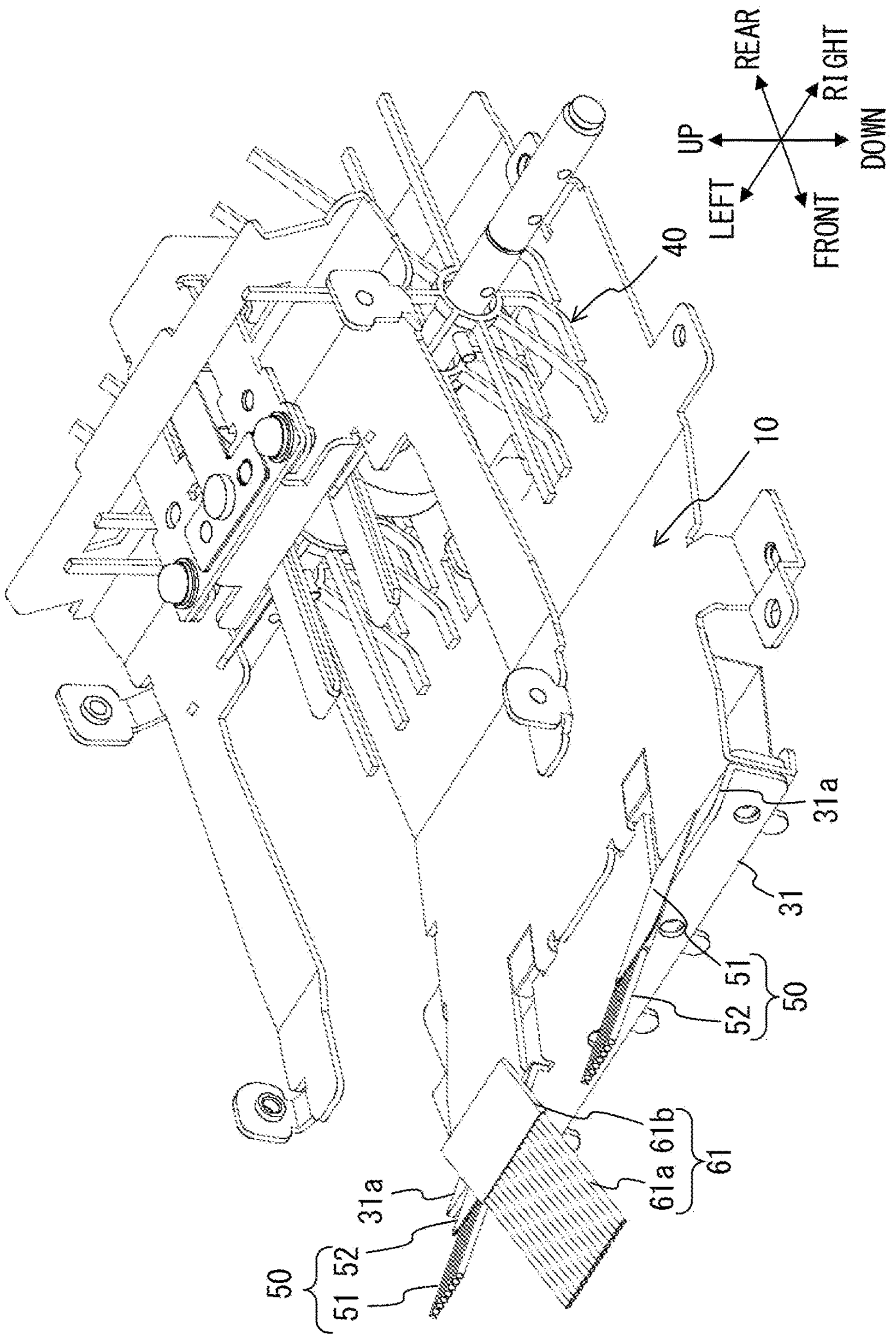
FIG. 4C is a front perspective view illustrating an accumulation part and guide parts in a second embodiment.
Figure 4D:
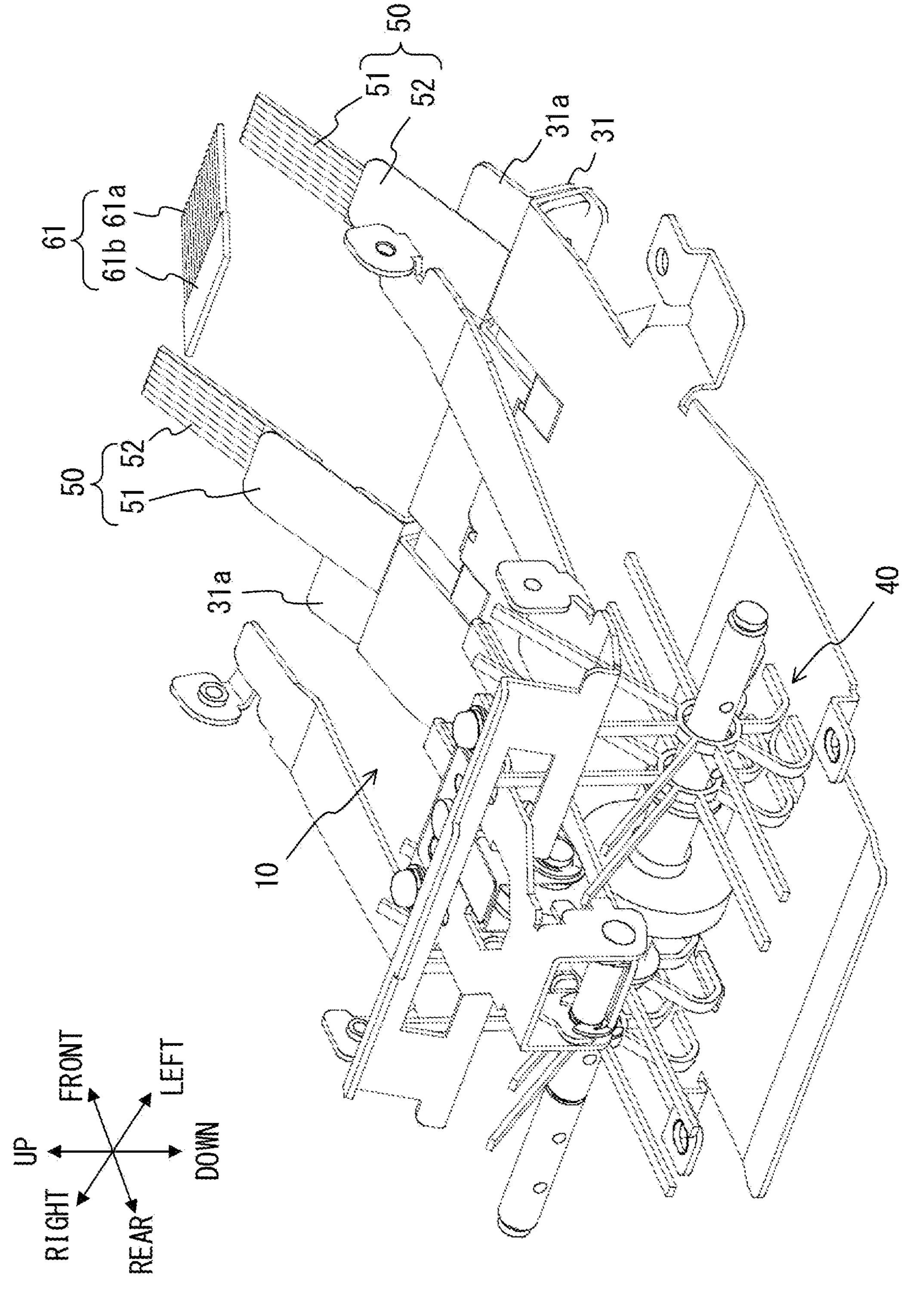
FIG. 4D is a back perspective view illustrating an accumulation part and guide parts in a second embodiment.

As depicted in FIGS. 4B-4D, for example, two guide parts 50 may be disposed to be spaced apart from each other in the left-right direction (the width direction of a bill B). Alternatively, one guide part 50 or three or more guide parts 50 may be provided.

As illustrated in FIG. 4A, the leading-edge side of a bill B within the accumulation part 10 in the entering direction of the bill B entering the accumulation part 10 (front direction) is placed on the guide part 50. The guide part 50 extends in the entering direction obliquely upward. As the number of bills B accumulated within the accumulation part 10 increases (see bills B-1 indicated by dashed lines), the guide part 50 is elastically deformed under the weight of the bills B such that the leading edge portion thereof is lowered (see the guide part 50-1 indicated by a two-dot dash line). For example, the guide part 50 may be rotatably supported by a rotation shaft and biased to rotate upward by a biasing mechanism such as a torsional spring provided on the rotation shaft. In this case, the biasing mechanism biases and thus rotates the guide part 50 upward with such a biasing force that the leading edge portion of the guide part 50 is lowered under the weight of a certain number of bills B.

As depicted in FIGS. 4B-4D, the two guide parts 50 each include an elastic plate 51 shaped like a plate and an antistatic brush 52.

For example, the elastic plate 51 may be a plastic film such as a polyimide film or a mylar (polyester) film.

The antistatic brush 52 includes a base section 52*b* fixed to the bottom surface of the elastic plate 51 and a brush body 52*a* with a plurality of bristles protruding from the base section 52*b*. The antistatic brush 52 is an example of an antistatic member.

The base section 52*b* of the antistatic brush 52 is fixed to a portion of the bottom surface of the elastic plate 51 that is located on the leading-edge side, so the guide part 50 is elastically deformed such that the leading edge portion of thereof is lowered in accordance with the elastic plate 51 being elastically deformed under the weight of bills B. The guide part 50 is also elastically deformed such that the leading edge portion of thereof is lowered in accordance with the brush body 52*a* of the antistatic brush 52 being elastically deformed under the weight of bills B.

The antistatic brush 61 is an example of an abutment member abutted by the leading edge portion of a bill B within the accumulation part 10. As with the antistatic brush 52 of the guide part 50, the antistatic brush 61 includes a brush body 61*a* and a base section 61*b*. The antistatic brush 61 is an example of an antistatic member.

The antistatic brush 61 extends in the entering direction of a bill B (front direction) obliquely downward.

The leading edge portion of a bill B abuts the brush body 61*a*. The base section 61*b* is fixed inside the paper sheet handling apparatus 1.

As with the elastic plate 51, the abutment member, an example of which is the antistatic brush 61, may be formed from an elastic member such as a plastic film or from a nonelastic member. The abutment member is not limited to the antistatic brush 61. Meanwhile, the abutment member, an example of which is the antistatic brush 61, may be disposed together with the guide part 20 in the first embodiment.

A fixation member 31 for fixing, as depicted in FIGS. 4A-4D, the guide part 50 is fixed inside the paper sheet handling apparatus 1 by a fixation screw 32. Thus, the fixation member 31 can be attached/detached together with the guide part 50 by screwing/unscrewing the fixation screw 32.

The fixation member 31 includes two supporting sections 31*a* each supporting each of the guide parts 50 (elastic plates 51). The supporting section 31*a* extends, together with the guide part 50, in the entering direction (front direction) obliquely upward and supports the base side of the guide part 50. The base portion of the guide part 50 may be fixed inside the paper sheet handling apparatus 1 together with the fixation member 31 by the fixation screw 32.

The impeller 40 depicted in FIGS. 4A, 4C, and 4D is an example of a transportation unit that causes a bill B to enter the accumulation part 10 by transporting the same.

The second embodiment can exhibit similar effects to the first embodiment in terms of similar matters, e.g., the effect of stabilizing the accumulation of bills B.

In the second embodiment, the guide part 50 includes the antistatic brush 52, i.e., an example of an antistatic member. Thus, bills B can be suppressed from being charged. In this way, the accumulation of bills B can be suppressed from being misaligned by static electricity, thereby stabilizing the accumulation of bills B more effectively.

In the second embodiment, the paper sheet handling apparatus 1 further includes the antistatic brush 61, i.e., an example of an abutment member abutted by the leading edge portion of a bill B within the accumulation part 10, and the antistatic brush 61 extends obliquely downward and in the entering direction of a bill B entering the accumulation part 10 (front direction). Hence, the placement positions of bills B abutting the antistatic brush 61 extending in the entering direction obliquely downward, i.e., the placement position on the guide part 50, are stabilized, thereby suppressing misalignment of the accumulation of the bills B.

In the second embodiment, the abutment member abutted by the leading edge portion of a bill B within the accumulation part 10 is the antistatic brush 61 (an example of an antistatic member). In particular, the abutment member includes the antistatic brush 61. Thus, the accumulation of bills B can be suppressed from being misaligned by static electricity, thereby stabilizing the accumulation of bills B more effectively.

Third Embodiment

Figure 5:
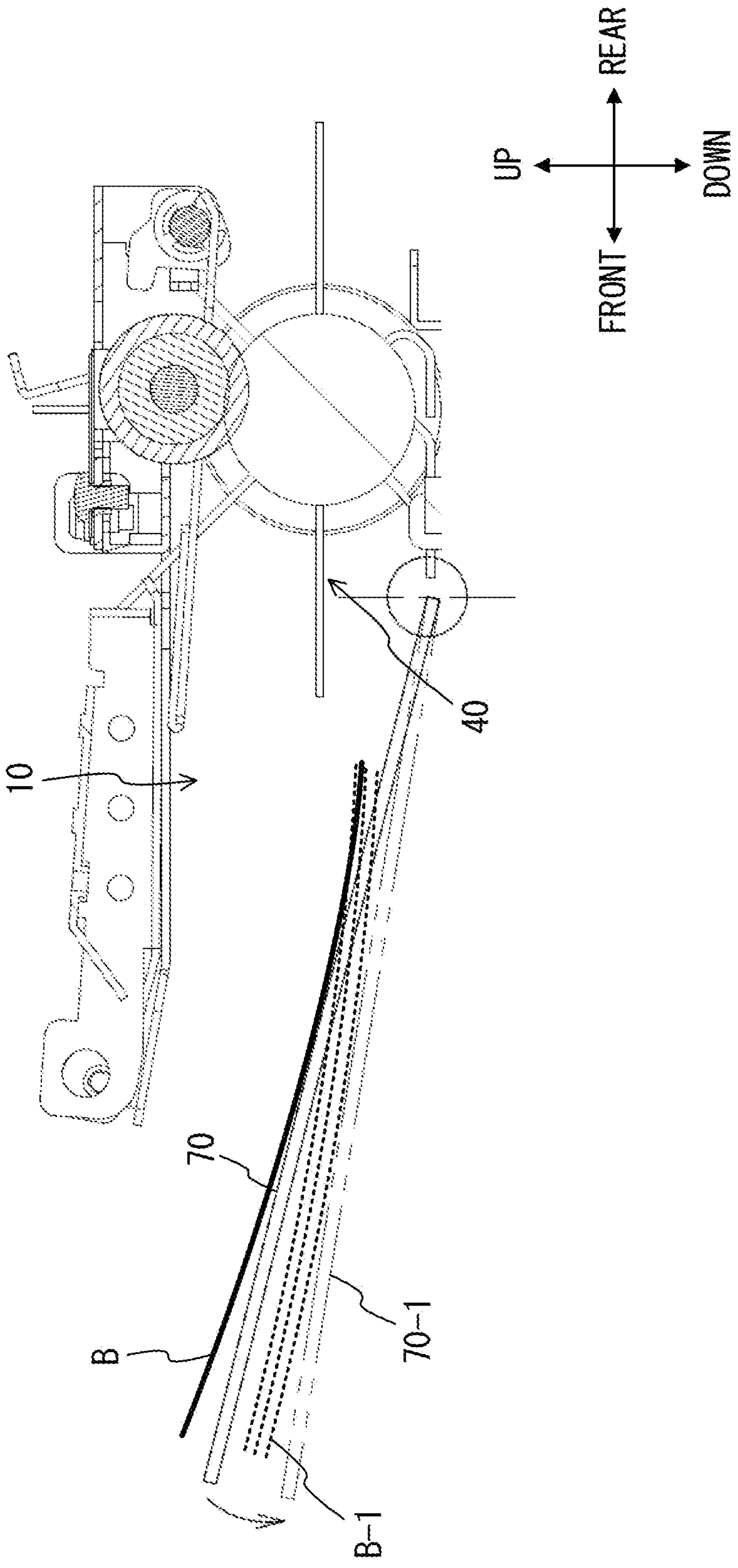
FIG. 5 is a right side view illustrating an accumulation part and a guide part in a third embodiment.

FIG. 5 is a right side view illustrating the accumulation part 10 and a guide part 70.

The third embodiment is different from the first embodiment in that a guide part 70 on which the entirety of a bill B in the entering direction (front direction) is placed is provided, instead of the guide part 20 in the first embodiment on which only the leading-edge side of a bill B in the entering direction is placed. Regarding the other matters, the third embodiment may be the same as the first embodiment, and detailed descriptions of such matters in the third embodiment are omitted herein.

As depicted in FIG. 5, the guide part 70 is disposed over the entirety of the bottom surface of the accumulation part 10. Thus, the entirety of a bill B within the accumulation part 10 in the entering direction of the bill B entering the accumulation part 10 (front direction) is placed on the guide part 70. The guide part 70 extends in the entering direction obliquely upward. As the number of bills B accumulated within the accumulation part 10 increases (see bills B-1 indicated by dashed lines), the leading edge portion of the guide part 70 is lowered (see the guide part 70-1 indicated by a two-dot dash line) under the weight of the bills B. As in the first and second embodiments, a plurality of guide parts 70 may be disposed to be spaced apart from each other in the left-right direction (the width direction of a bill B).

For example, the guide part 70 may include a single elastic plate and be fixed inside the paper sheet handling apparatus 1 by a fixation member (not illustrated). However, as in the first or second embodiment, the guide part 70 may include the first elastic plate 21 and the second elastic plate 22 or include the elastic plate 51 and the antistatic brush 52 (an example of the antistatic member). In the third embodiment, the antistatic brush 61 (an example of the antistatic member), i.e., an example of the abutment member, may be disposed as in the second embodiment.

For example, the guide part 70 may be rotatably supported by a rotation shaft and biased to rotate upward by a biasing mechanism such as a torsional spring provided on the rotation shaft. In this case, the biasing mechanism biases and thus rotates the guide part 70 upward with such a biasing force that the leading edge portion of the guide part 70 is lowered under the weight of a certain number of bills B.

The impeller 40 depicted in FIG. 5 is an example of a transportation unit that causes a bill B to enter the accumulation part 10 by transporting the same.

The third embodiment can exhibit similar effects to the first and second embodiments in terms of similar matters, e.g., the effect of stabilizing the accumulation of bills B.

In the third embodiment, the entirety of a bill B within the accumulation part 10 in the entering direction of the bill B entering the accumulation part 10 (front direction), i.e., not only the leading-edge side of the bill B in the entering direction, is placed on the guide part 70. Hence, the entirety of bills B can be accumulated obliquely upward with reference to the entering direction, so even if a curved bill B, e.g., a curled bill B, is placed in the accumulation part 10, the rear edge portion of the bill B can be suppressed more effectively from being warped upward. Meanwhile, as the number of bills B accumulated within the accumulation part 10 increases (see the bills B-1 indicated by dashed lines in FIG. 5), the entirety of the guide part 70 is lowered under the weight of the bills B (see the guide part 70-1 indicated by a two-dot dash line), so that the bills B can be easily accumulated with a desired inclination.

The present invention is not simply limited to the first to third embodiments. Components of the embodiments may be embodied in a varied manner in an implementation phase without departing from the gist of the invention. A plurality of components disclosed with reference to the first to third embodiments may be combined, as appropriate, to achieve various inventions. For example, all of the components indicated with reference to the first to third embodiments may be combined, as appropriate. Accordingly, various variations and applications of the invention can be provided without departing from the gist of the invention.

The invention claimed is:

1. A paper sheet handling apparatus comprising:
- an accumulation part in which paper sheets are accumulated;
- a guide part on which at least leading-edge sides of the paper sheets within the accumulation part in an entering direction of the paper sheets entering the accumulation part are placed, and
- an antistatic brush abutted by leading edge portions of the paper sheets in the entering direction within the accumulation part, wherein:
- the guide part extends in the entering direction obliquely upward and is lowered under a weight of the paper sheets, and
- the antistatic brush extends in the entering direction obliquely downward.

2. The paper sheet handling apparatus of claim 1, wherein the guide part includes a first guide section and a second guide section disposed over the first guide section in an overlapping manner and extending by a longer distance than the first guide section.

3. The paper sheet handling apparatus of claim 1, wherein the guide part includes an elastic plate shaped like a plate and is lowered in accordance with the elastic plate being elastically deformed under a weight of the paper sheets.

4. The paper sheet handling apparatus of claim 1, wherein the guide part includes an antistatic member.

5. The paper sheet handling apparatus of claim 1, further comprising:
- a fixation member for fixing the guide part, wherein
  - the fixation member is capable of being attached and detached together with the guide part and supports a base side of the guide part.

* * * * *